(12) United States Patent
Schroeder

(10) Patent No.: US 6,776,058 B1
(45) Date of Patent: Aug. 17, 2004

(54) DIGITAL MAGNETO-SENSITIVE TORQUE SENSOR

(75) Inventor: Thaddeus Schroeder, Rochester Hills, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/385,234

(22) Filed: Mar. 10, 2003

(51) Int. Cl.⁷ .............................................. G01L 3/02
(52) U.S. Cl. ................................................ 73/862.333
(58) Field of Search .................... 73/862.333, 862.328, 73/862.329, 862.332, 862.334, 862.335

(56) References Cited

U.S. PATENT DOCUMENTS

| | | | | |
|---|---|---|---|---|
| 3,824,848 A | * | 7/1974 | Parkinson | 73/862.328 |
| 4,835,467 A | | 5/1989 | Gokhale | 324/166 |
| 4,881,414 A | * | 11/1989 | Setaka et al. | 73/862.331 |
| 5,153,557 A | | 10/1992 | Partin et al. | 338/32 R |
| 5,184,106 A | | 2/1993 | Partin et al. | 338/32 R |
| 5,491,461 A | | 2/1996 | Partin et al. | 338/32 R |
| 5,570,016 A | | 10/1996 | Schroeder et al. | 324/207.25 |
| 5,731,702 A | | 3/1998 | Schroeder et al. | 324/207.21 |
| 5,754,042 A | | 5/1998 | Schroeder et al. | 324/207.25 |
| 6,201,466 B1 | | 3/2001 | Schroeder | 338/32 R |
| 6,289,748 B1 | | 9/2001 | Lin et al. | |
| 6,392,418 B1 | | 5/2002 | Mir et al. | |
| 6,511,135 B2 | | 1/2003 | Ballinger et al. | |
| 6,612,392 B2 | * | 9/2003 | Park et al. | 180/402 |

* cited by examiner

Primary Examiner—Max Noori
(74) Attorney, Agent, or Firm—Jimmy L. Funke

(57) ABSTRACT

A digital torque sensor employing a torsion bar, a target wheel at each end thereof, and at least two magnetosensitive (galvanomagnetic) sensors, in the form of magnetosensitive arrays, one for each target wheel, respectively, to precisely determine the angle of twist of the torsion bar. The torque sensor also provides target wheel relative position, rotational speed and rotational direction, and is capable of self-compensation over wide temperature ranges and air gaps, including tilts, does not require tight assembly tolerances and has a theoretically infinite life due to its non-contact nature.

20 Claims, 9 Drawing Sheets

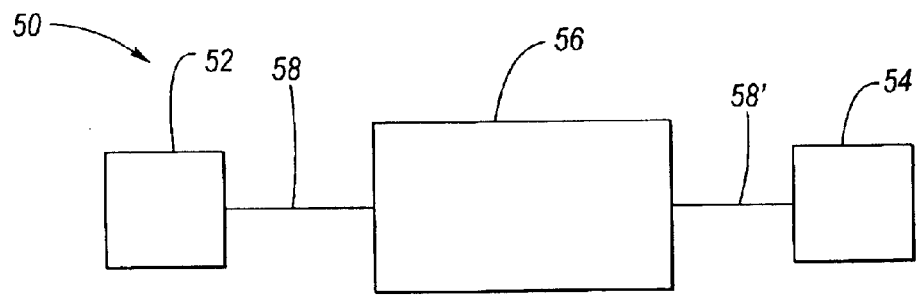
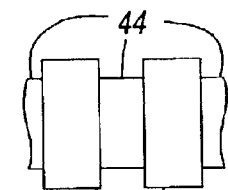
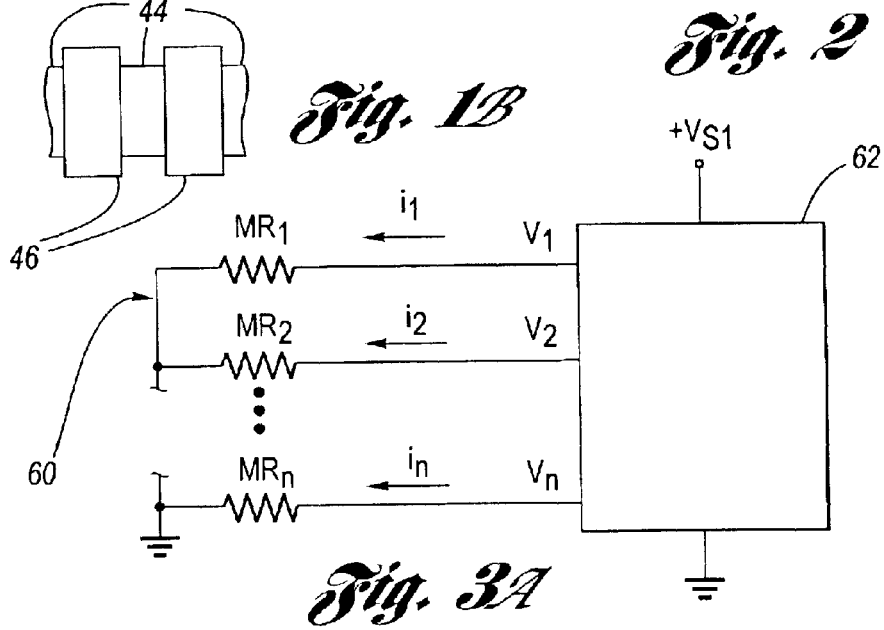
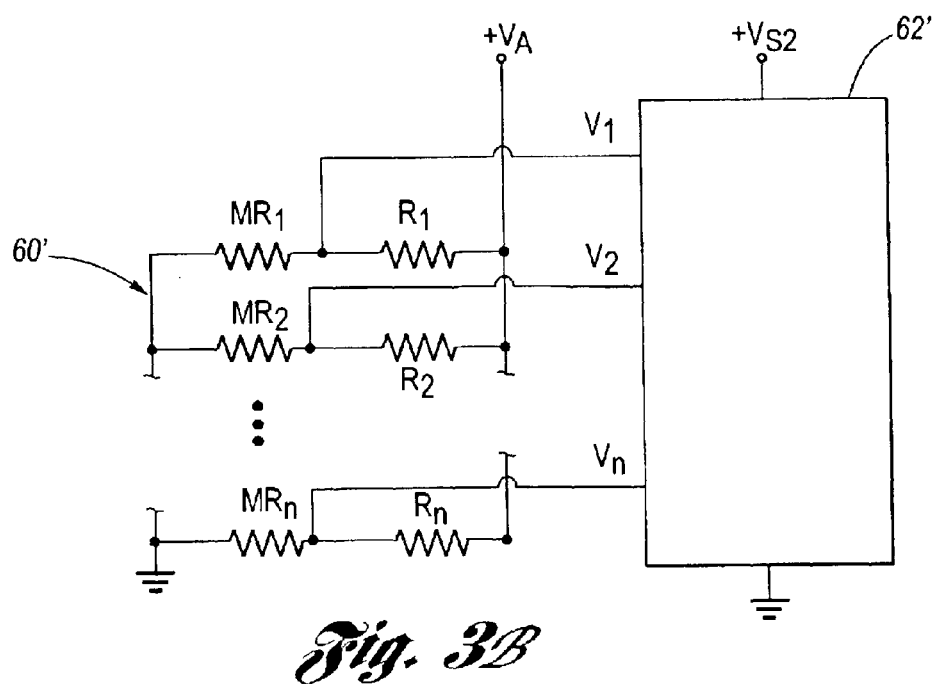

DIGITAL MAGNETO-SENSITIVE TORQUE SENSOR

TECHNICAL FIELD

The present invention relates to magnetosensitive or galvanomagnetic devices (e.g. Hall generators, magnetoresistors, etc.) arranged in arrays for use as digital torque sensors.

BACKGROUND OF THE INVENTION

Only analog sensors are available or known for use as torque sensors in automotive applications such as electronic power steering (EPS), engine control systems, etc. The majority of torque sensors use strain gages attached to a rotating shaft whose signal is transmitted through slip rings. In some cases, inductive coupling, infrared, or radio frequency methods are utilized for transmission instead of slip rings. These types of sensors are highly accurate, but they are not suitable for in-vehicle applications due to the fragile nature of strain gages and the way they have to be attached to the shaft surface.

Presently, the torque sensor selected for EPS is of the resistive film type, which works in conjunction with a torsion bar. Essentially, it is a potentiometer translating the angle of the torsion bar twist into an electrical resistance value. It requires slip rings for signal transmission and, at least in principle, might have limited life due to localized film wear-out caused by extensive dithering.

Noncontacting compliant torque sensors utilizing a torsion bar to convert a twist of the torsion bar into torque by measuring the angular offset between the ends of the torsion bar are also known in the art. These torque sensors utilize various analog measurement techniques.

The use of magnetosensitive or galvanomagnetic devices, such as magnetoresistors (MRs) and Hall devices, as non-contacting position and angle sensors is well known in the art. For example, a magnetically biased differential magnetoresistive sensor may be used to sense angular position of a rotating toothed wheel, as for example exemplified by U.S. Pat. Nos. 4,835,467, 5,731,702, and 5,754,042.

In such applications, the magnetoresistor (MR) is biased with a magnetic field and electrically excited, typically, with a constant current source or a constant voltage source. A magnetic (i.e., ferromagnetic) object moving relative, and in close proximity, to the MR, such as a toothed wheel, produces a varying magnetic flux density through the MR, which, in turn, varies the resistance of the MR. The MR will have a higher magnetic flux density and a higher resistance when a tooth of the moving target wheel is adjacent to the MR than when a slot of the moving target wheel is adjacent to the MR.

Increasingly, more sophisticated spark timing and emission controls introduced the need for crankshaft sensors capable of providing precise position information during cranking. Various combinations of magnetoresistors and single and dual track toothed or slotted wheels (also known as encoder wheels and target wheels) have been used to obtain this information (see for example U.S. Pat. No. 5,570,016.

Single element magnetic field sensors composed of, for example, an indium antimonide or indium arsenide epitaxial film strip supported on, for example, a monocrystalline elemental semiconductor substrate, are also known. The indium antimonide or indium arsenide film is, for example, deposited either directly on the elemental semiconductor substrate or on an intermediate film that has a higher resistivity than that of silicon. A conductive contact is located at either end of the epitaxial film, and a plurality of metallic (gold) shorting bars are on, and regularly spaced along, the epitaxial film. U.S. Pat. Nos. 5,153,557, 5,184,106 and 5,491,461 exemplify examples thereof.

Many kinds of measurements require high accuracy and high resolution, and, as such, cannot easily be performed with common magnetic sensors comprising a single sensing element or dual sensing elements. Improved accuracy and resolution measurements can be achieved, however, using an array. The most common magnetic sensing element, the Hall effect element or device, does not quite fit the requirements for an array. Being a 4-terminal device complicates the array connections. Furthermore, its low output signal mandates the use of an integrated amplifier for each sensing element increasing the die size and its cost. Nonetheless, appropriately configured Hall sensors can be incorporated into Hall arrays.

However, compound semiconductor MRs, such as those manufactured from InSb, InAs, etc. are simply two-terminal resistors with a high magnetic sensitivity. Thus, compound semiconductor MRs are very suitable for the construction of single die MR array geometries for use as large range angular position sensors. In most cases, one terminal of all the MR elements can be common.

Ultimately, such MR arrays could be integrated on the same die with appropriate processing circuitry. For example, if the MR array were fabricated on a Si substrate then the processing circuitry would be also Si based. For higher operating temperatures, silicon-on-insulator (SOI) fabrication could be used. A potentially lower cost alternative to the SOI approach would be to take advantage of the fact that MRs are currently fabricated on GaAs, a high temperature semiconductor. In this regard, the integrated processing circuitry is fabricated on GaAs (or related InP) using HBT (Heterojunction Bipolar Transistor) or HEMT (High Electron Mobility Transistor) structures. This technology is now easily available and inexpensive through the explosive growth of the cellular phone industry.

Accordingly, what is needed is a compact and inexpensive die having at least two arrays of magnetosensitive elements and configured so as to produce an array geometry suitable for torque sensing schemes in which the output signals are capable of being directly coupled to digital signal processing electronics, such as a digital signal processor or microprocessor, whereby appropriate algorithms can provide, for example, target torque information, target position information, direction of target rotation, and target rotational speed information.

SUMMARY OF THE INVENTION

The present invention is a compact, inexpensive, high accuracy, non-contacting digital torque sensor employing a torsion bar, a target wheel at each end thereof, and at least two magnetosensitive (galvanomagnetic) sensors, in the form of magnetosensor device arrays (one for each target wheel, respectively), to precisely determine the angle of twist of the torsion bar (unlike present art compliant analog torque sensors employing a torsion bar and utilizing analog measuring techniques). The present invention also provides target wheel rotation speed, position and rotational direction information, is capable of self-compensation over wide temperature ranges and air gaps, including tilts, does not require tight assembly tolerances and has a theoretically infinite life due to its non-contact nature. The present invention can also be smaller than the present resistive film type torsion sensor and can meet anticipated future reduced size requirements.

The present invention employs two identical target wheels, having peripherally disposed magnetic irregularities preferably consisting of teeth and slots, fixedly attached to opposing ends of a torsion bar. By "fixedly attached" is meant that both target wheels must rotate in unison with twist of the torsion bar at its respective attachment location. The teeth and slots of the target wheels do not have to be aligned in any particular way with respect to each other.

The teeth and slots of each target wheel are sensed by its respective magnetosensitive sensor, each being composed of an array of several magnetosensitive (galvanomagnetic) elements preferably manufactured on a single die to secure extremely accurate spacing between the elements. The arrays do not need to be placed at the same angular positions of the torsion bar or target wheels. The arrays may be located anywhere around the periphery of their respective target wheel provided that the array elements are aligned with the direction of target wheel rotation.

When the torque sensor is initially installed, each array is rapidly scanned by a microprocessor or a dedicated digital signal processor to compute the angular offset between the arrays corresponding to zero torque and zero differential displacement between the target wheels. This value is used in all subsequent torque computations and dispenses with any alignment requirements for either the target wheels or the arrays. Thereafter, when the torsion bar or target wheels are rotated or at a standstill, each array is rapidly scanned by a microprocessor or a dedicated digital signal processor to compute the precise torque induced phase shift between the target wheels, whereby appropriate algorithms can provide, for example, target torque information, target position information, direction of target rotation, and target rotational speed information. Scanning can be continuous or on demand only, depending upon the application, wherein the time required to scan both arrays is negligible compared to the speed of rotation of the target wheels (that is, relatively speaking, the target wheels are as if stationary during a scan).

Operatively, one target wheel is connected to a first component and the other target wheel is connected to a second component, wherein depending upon compliance of rotation between the first and second components, a torque therebetween arises which twists the torsion bar. Twisting of the torsion bar due to the torque results in a differential displacement between the magnetic irregularities of the target wheels as compared to a zero torque, zero differential displacement condition, wherein both wheels may be both rotating at any speed and for any number of revolutions. The maximum allowed differential displacement cannot exceed the length of the arrays, wherein preferably the length of the arrays exceeds the length of the pitch of the magnetic irregularities and the length of the pitch exceeds the differential displacement.

The arrays of magnetosensitive devices are incorporated, preferably, on at least one die in which the output signals are directly coupled to digital signal processing electronics, such as a digital signal processor or microprocessor, wherein the digital signal processing electronics may be, preferably, incorporated on the same die of magnetosensitive elements thereof, and whereby appropriate algorithms can provide, for example, target torque information, target position information, direction of target rotation information, and target rotational speed information.

According to a first aspect of the present invention, the torque sensor includes at least two arrays formed of a plurality of magnetosensitive elements, wherein the output signals are capable of being directly coupled to digital signal processing electronics, such as a digital signal processor or microprocessor, incorporated on the same die as that of the magnetosensitive elements. The arrangement of array elements is such as to provide a die suitable for use as a torque sensor, wherein signal processing is accomplished on a chip on the same die as that of the magnetosensitive elements such that appropriate algorithms can provide, for example, target torque information, target position information, direction of target rotation, and target rotational speed information.

According to a second aspect of the present invention, the torque sensor includes at least two arrays, each array on a separate die, whereby each array is formed of a plurality of magnetosensitive elements, wherein the output signals are capable of being directly coupled to a digital signal processor or microprocessor incorporated on one of the dies or elsewhere. The arrangement of the magnetosensitive elements is such as to be suitable for use as a torque sensor, wherein signal processing is accomplished such that appropriate algorithms can provide, for example, target torque information, target position information, direction of target rotation, and target rotational speed information.

According to the preferred embodiment of the first and second aspects of the present invention, magnetosensitive elements, preferably magnetoresistive (MR) elements, are incorporated in the arrays. The MR elements are arranged and configured so as to produce a variety of MR array geometries suitable for use as a torque sensor, wherein an MR array is defined as having three or more MR elements.

According to a preferred method of fabrication, an indium antimonide epitaxial film is formed, then masked and etched to thereby provide epitaxial mesas characterizing the MR elements. Shorting bars, preferably of gold, are thereupon deposited, wherein the epitaxial mesa not covered by the shorting bars provides MR segments of the MR element. The techniques for fabricating epitaxial mesas with shorting bars are elaborated in U.S. Pat. No. 5,153,557, issued Oct. 6, 1992, U.S. Pat. No. 5,184,106, issued Feb. 2, 1993, U.S. Pat. No. 5,491,461, issued Feb. 13, 1996, and U.S. Pat. No. 6,201,466, issued Mar. 13, 2001, each of which being hereby incorporated herein by reference.

Accordingly, it is an object of the present invention to provide a torque sensor incorporated on an MR die comprising at least one MR array according to the first and second aspects of the present invention.

This and additional objects, features and advantages of the present invention will become clearer from the following specification.

BRIEF DESCRIPTION OF THE DRAWINGS

FIG. 1B is a detail view of an element of an array of the torque sensor of FIG. 1.

FIG. 2 is a schematic representation of the preferred embodiment of a torque sensor according to the second aspect of the present invention.

FIG. 3A is a schematic representation of a constant current drive for MR arrays.

FIG. 3B is a schematic representation of a constant voltage drive for MR arrays.

DETAILED DESCRIPTION OF THE PREFERRED EMBODIMENT

Figure 1:
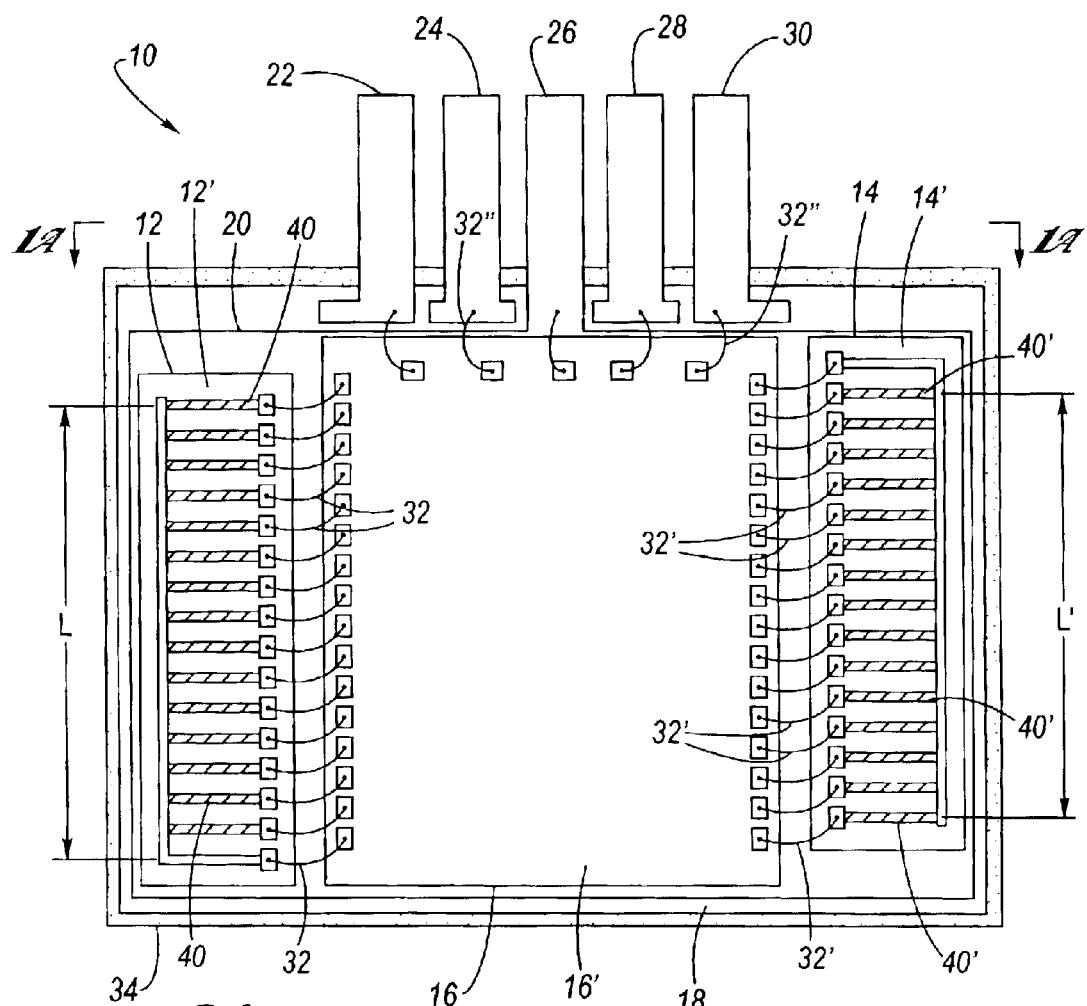
FIG. 1 is a top plan view of a preferred embodiment of a torque sensor according to a first aspect of the present invention.

Referring now to the Drawings, FIGS. 1 through 1B depict a preferred embodiment of a torque sensor 10 according to the first aspect of the present invention. The torque sensor 10 is enclosed in plastic overmold 34 and consists of magnetosensitive (galvanomagnetic) arrays 12, 14, preferably identical, and, preferably magnetoresistor (MR) arrays, incorporated on dies 12', 14', digital signal processing electronics 16, such as a digital signal processor or microprocessor, incorporated on a die 16', a bias magnet 18, a lead frame 20, output terminals 22, 24, 26, 28, 30 (for example for torque output, speed output, ground, position output and +V, respectively), and appropriate wire bonds 32, 32', 32". Each array 12, 14 has, preferably, the same number, n, of elements 40, 40', each, per this example, composed of a plurality of MR segments 44 demarcated by shorting bars 46 (see FIG. 1B). The length L, L' of each array, respectively, is preferably the same, wherein the length of an array is defined as the distance between the center of a first array element to the center of a last array element of an individual array. If silicon is used as the die substrate, the magnetosensitive arrays 12, 14, preferably, in this case, Hall arrays, and digital signal processing electronics 16 may be incorporated on a common die, such as the die 16'. The technique to accomplish this is well known in the art as previously described.

Figure 1A:
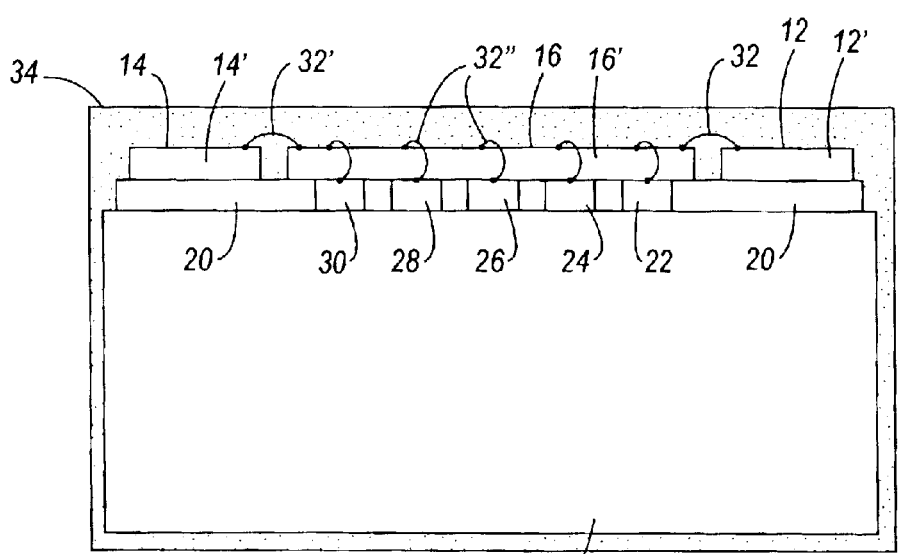
FIG. 1A is a partly sectional side view seen along line 1A—1A of FIG. 1.

FIG. 2 is a first pictorial representation of the preferred embodiment of a torque sensor 50 according to the second aspect of the present invention. Magnetosensitive (galvanomagnetic) arrays 52, 54, as exemplified by the arrays 12, 14 of FIG. 1, preferably MR arrays, and digital signal processing electronics 56, such as a digital signal processor or microprocessor, are incorporated on separate dies, as exemplified by the array dies 12', 14' and the digital signal processing electronics die 16' of FIG. 1, and are physically separated from one another. The construction of each array 52, 54, preferably identical, and digital signal processing electronics 56, as exemplified by the arrays 12, 14 and array dies 12', 14' and the digital signal processor 16 and digital signal processing electronics die 16' of FIG. 1, is accomplished by techniques well known in the art as previously described per FIGS. 1 and 1A.

Lines 58, 58' denote power lines and signal lines between the arrays 52, 54 and the digital processing electronics 56. The lengths of the arrays 52, 54 (not shown at FIG. 2) are exemplified by array lengths L, L' of FIG. 1, and are, preferably, mutually the same.

FIG. 3A is a schematic representation of an MR array 60, such as arrays 12, 14 of FIG. 1 or arrays 52, 54 of FIG. 2, driven by a constant current drive incorporated within digital signal processing electronics 62, such as digital signal processing electronics 16 of FIG. 1 or the digital processing electronics 56 of FIG. 2. The currents $i_1$ through $i_n$ have, preferably, the same value and are produced by either n matched independent current sources incorporated within the digital signal processing electronics 62 or by a single constant current source and a mutiplexer incorporated within the digital signal processing electronics, wherein the mutiplexer selects sequentially each array element $MR_1$ through $MR_n$ to be energized. Either n analog to digital (A/D) converters, incorporated within digital signal processing electronics 62, are utilized with the n matched current sources to convert the analog voltages $V_1$ through $V_n$ to a digital form or a single A/D converter, incorporated within digital signal processing electronics 62, is utilized with the single current source and multiplexer to convert analog voltages $V_1$ through $V_n$ to a digital form. The techniques of incorporating the above mentioned current sources, mutiplexers, and A/D converters within the digital signal processing electronics 62 are well known in the art.

FIG. 3B is a schematic representation of a constant voltage $V_A$ driving an MR array 60', such as the arrays 12, 14 of FIG. 1 or arrays 52, 54 of FIG. 2. The voltage $V_A$ may be the same as $V_{S2}$ or a separate voltage source. The resistors $R_1$ through $R_n$ have, preferably, the same value and may be incorporated within the digital signal processing electronics 62'. The digital signal processing electronics 62' may incorporate n A/D converters or one A/D converter and a multiplexer as previously described in conjunction with FIG. 3A.

Figure 3C:
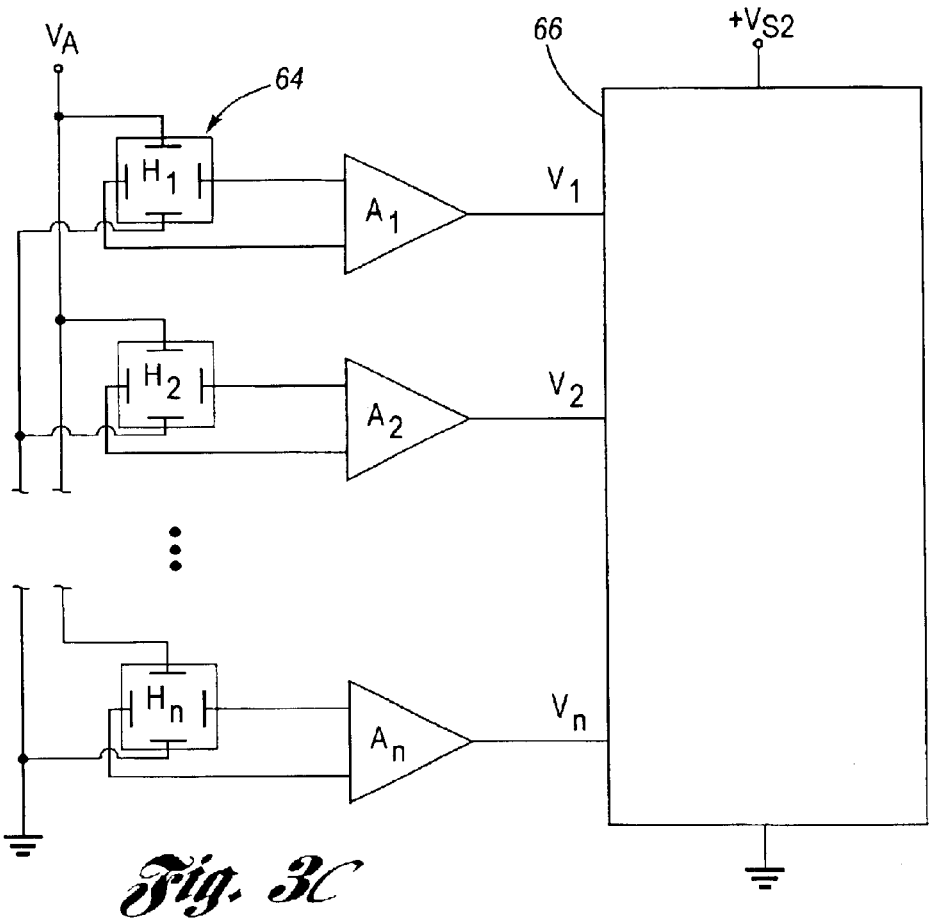
FIG. 3C is a schematic representation of an array of Hall elements or devices.

FIG. 3C is a schematic representation of an array 64 of Hall elements or devices $H_1$ through $H_n$, such as the arrays 12, 14 of FIG. 1, if the Hall elements are silicon based, or the arrays 52, 54 of FIG. 2, for non-silicon based Hall elements. For illustrative purposes, simplistic single cell Hall generators are depicted. In practice, each Hall element or device $H_1$ through $H_n$ would be a more complex four Hall generator switchable cell, devices well known in the art. Elements $A_1$ through $A_n$ are differential amplifiers supplying voltages $V_1$ through $V_n$ as inputs to a digital signal processor 66, such as digital signal processing electronics 16 of FIG. 1 or the digital signal processing electronics 56 of FIG. 2. The digital signal processing electronics may incorporate n A/D converters or one A/D converter and a multiplexer as previously described in conjunction with FIG. 3A. The voltage $V_A$ may be the same as $V_{S3}$ or a separate voltage source.

Figure 4:
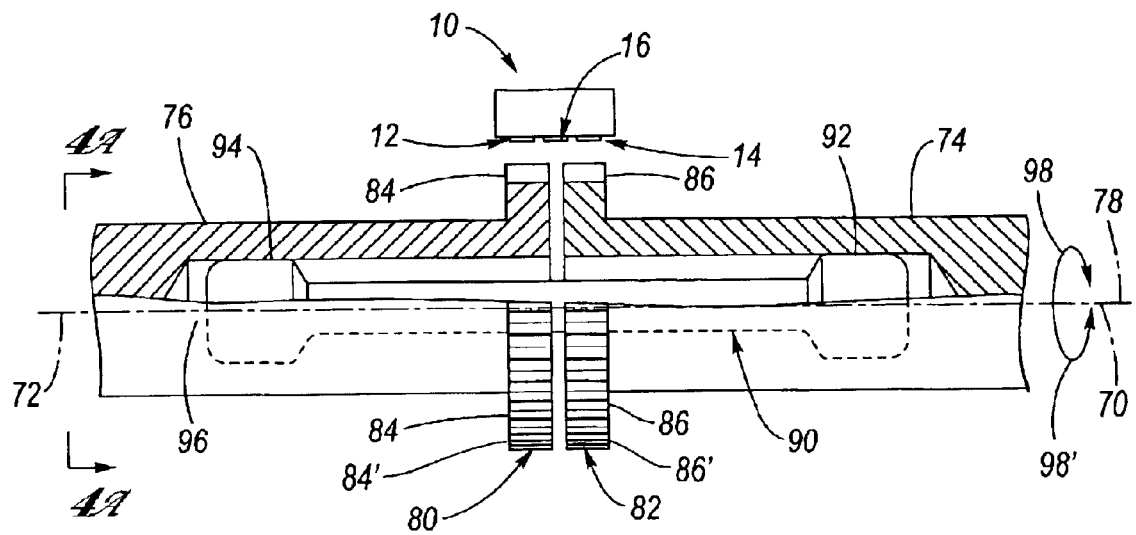
FIG. 4 is a partly sectional side view of a first example of a preferred environment of use of the preferred embodiment of the first aspect of the present invention.
Figure 4A:
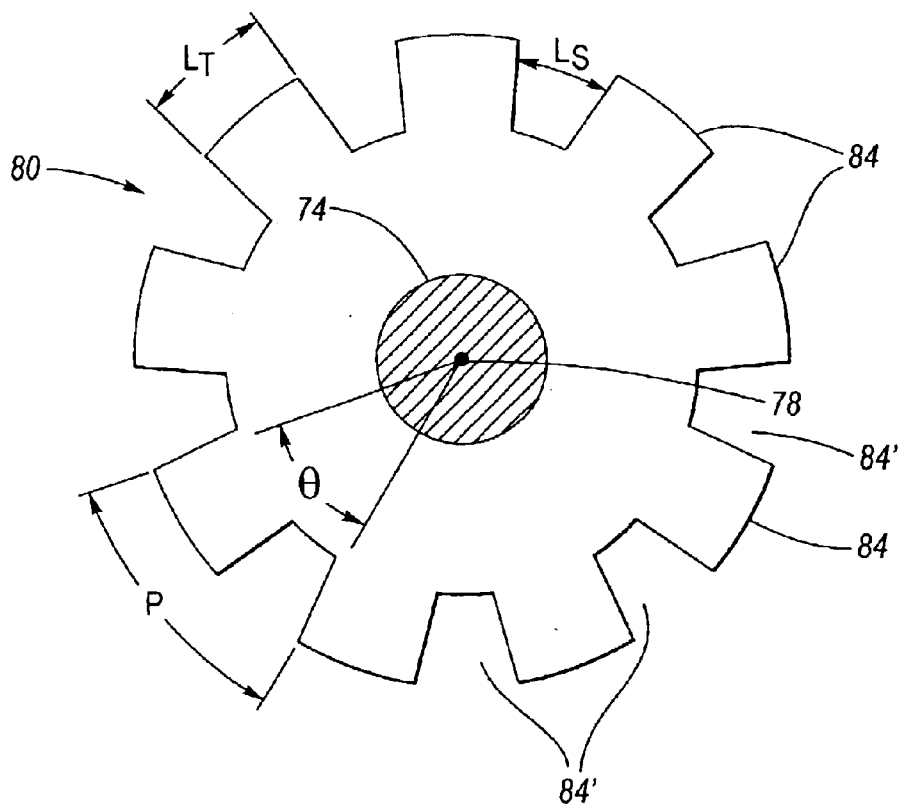
FIG. 4A is a partly sectional end view, seen along line 4A—4A of FIG. 4.

FIGS. 4 and 4A depict a first example of the preferred environment of use of the preferred embodiment of the first aspect of the present invention. The arrays 12, 14 of the torque sensor 10, preferably stationary, are aligned such that the array lengths L, L', preferably equal lengths, are perpendicular to the axes 70 and 72 of the half shafts 74, 76, wherein the axes of the half shafts lie on the same axis 78. The half shafts 74, 76 are comprised of target wheels 80, 82 at one end of each half shaft consisting of teeth 84, 86 separated by slots 84', 86', respectively. The teeth and slots of each target wheel are aligned parallel to the array lengths L, L' and in close proximity thereto and the axis of each target wheel lies on axis 78. That is, the array lengths L, L' are aligned parallel with the direction of rotation 98, 98' of the target wheels 80, 82. Target wheel 80 is, preferably, identical to target wheel 82. The relation between the array lengths L, L', tooth pitch P of the target wheels 80 and 82, and the compliance range of the torsion bar 90 is to be described later. The torsion bar 90 is calibrated and aligned within the half shafts 74, 76 such that the axis 96 of the torsion bar also lies on axis 78. The torsion bar 90 is fixedly attached at locations 92, 94 to each half shaft 74, 76, respectively, and can rotate about axis 78 in the directions of 98, 98', as depicted.

As an example, the end of half shaft 74 opposite of target wheel 82 may be connected to a load such as the steering mechanism of a vehicle, while the end of half shaft 76 opposite of target wheel 80 may be connected to a drive torque such as the steering wheel of a vehicle. When the steering wheel is rotated in either direction 98, 98' (clockwise or counterclockwise) about axis 78, a torque is applied to torsion bar 90, thereby twisting the torsion bar and offsetting the target wheels 80, 82 producing an output from the arrays 12, 14 to the digital signal processing electronics 16 as the teeth 84, 86 and the slots 84', 86' pass the array elements 40, 40'. Proper algorithmic processing by digital signal processing electronics 16, to be described later, of the output from the arrays 12, 14 can determine target torque information, target position information, direction of target rotation, and target rotational speed information.

The arrays 12, 14 do not need to be aligned at the same angular position of the torsion bar 90 or the target wheels 80, 82. The arrays 12, 14 can be located anywhere around the periphery of their respective target wheel 80, 82 provided that the array lengths L, L' are aligned with the direction of rotation of their respective target wheel, as previously described. The target wheels 80, 82 need not be angularly aligned with respect to one another other than described above.

Figure 5:
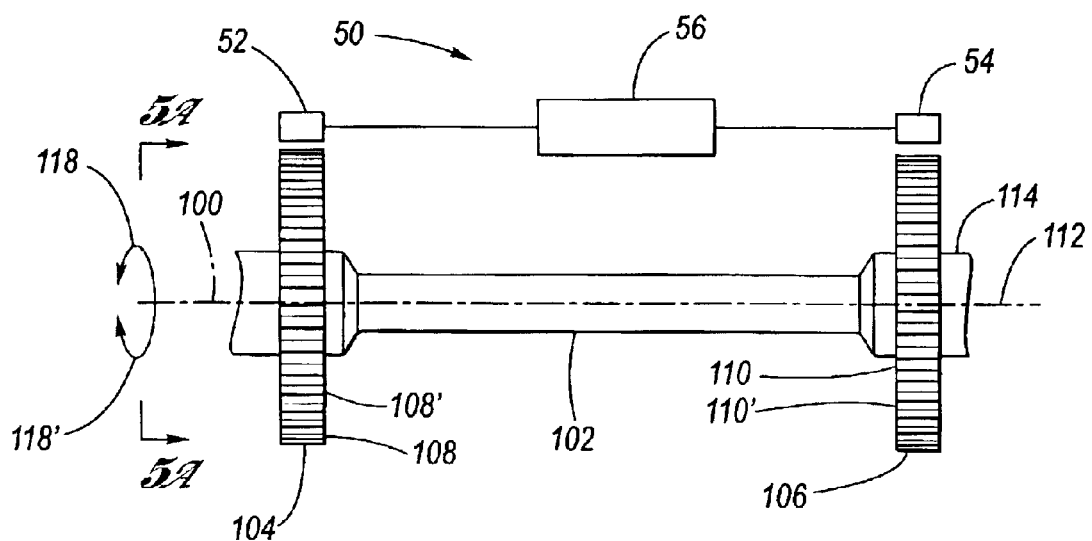
FIG. 5 is a side view of a second example of the preferred environment of use of the preferred embodiment of the second aspect of the present invention.
Figure 5A:
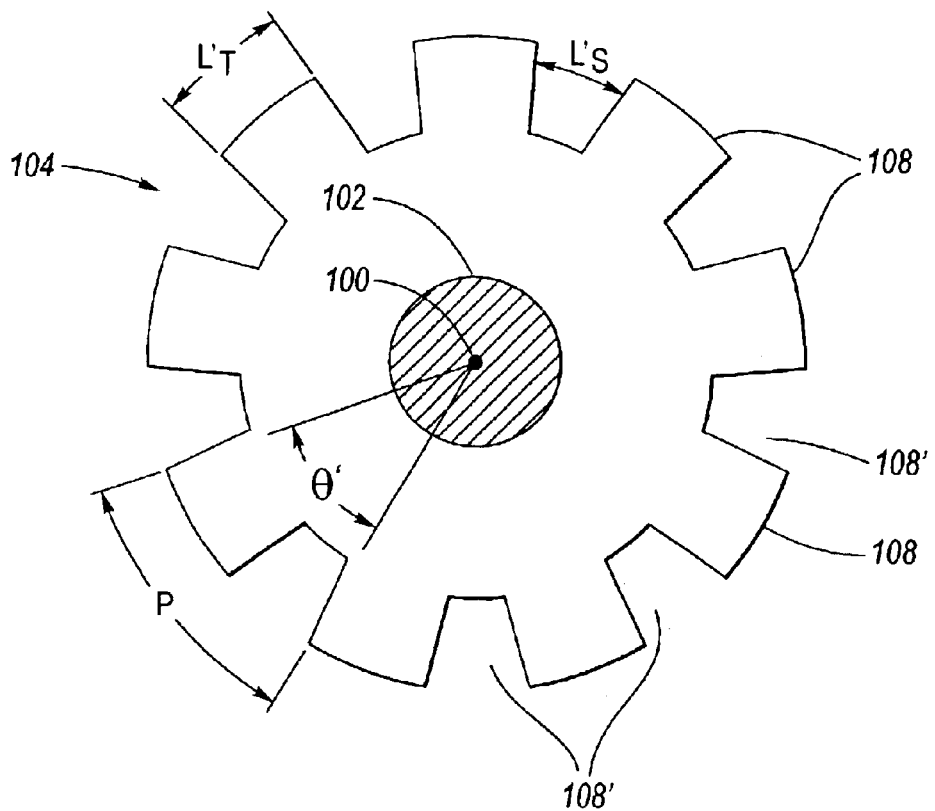
FIG. 5A is a partly sectional end view, seen along line 5A—5A of FIG. 5.

FIGS. 5 and 5A depict a second example of the preferred environment of use of the preferred embodiment of the second aspect of the present invention. The arrays 52, 54 of a torque sensor 50, which is preferably stationary, are aligned such their array lengths, preferably equal lengths, not shown, exemplified by array lengths L, L' of FIG. 1, are oriented perpendicular to the axis 100. The torsion bar 102 is comprised of target wheels 104, 106 fixedly connected at each end of the torsion bar, as depicted. The target wheels 104, 106 consist of teeth 108, 110 separated by slots 108', 110', respectively, such that the teeth and slots of each target wheel are aligned parallel to their respective array lengths, as exemplified by array lengths L, L', and in close proximity thereto. That is, the array lengths of the arrays 52, 54 are aligned parallel with the direction of rotation 118, 118' of the target wheels 104, 106. Target wheel 104 is, preferably, identical to target wheel 106. The relation between their array lengths, tooth pitch P' of the target wheels 104, 106, and the compliance range of the torsion bar 102 is to be described later. The torsion bar 102 is calibrated and aligned such that the axis 112 of the torsion bar also lies on the axis 100 and can rotate about the axis 100 in the either direction of 118, 118', as depicted.

As an example, the end 114 of the torsion bar 102 may be connected to a load such as the steering mechanism of a vehicle, while the opposite end 116 of the torsion bar may be connected to a drive torque such as the steering wheel of a vehicle. When the steering wheel is rotated in either direction 118, 118' (clockwise or counterclockwise) about the axis 100, a torque is applied to the torsion bar 102, thereby twisting the torsion bar and offsetting the target wheels 104, 106 producing an output from the arrays 52, 54 to digital signal processing electronics 56 as the teeth 108, 110 and the slots 108', 110' pass the array elements 40, 40'. Proper algorithmic processing by the digital signal processing electronics 56, to be described later, of the output from the arrays 52, 54 can determine target torque information, target position information, direction of target rotation, and target rotational speed information. The alignment of the arrays 52, 54 as well as the alignment of the target wheels 104, 106 is analogous to that described for the arrays 12, 14 of FIG. 1 and the target wheels 80, 82 of FIG. 4.

Figure 6:
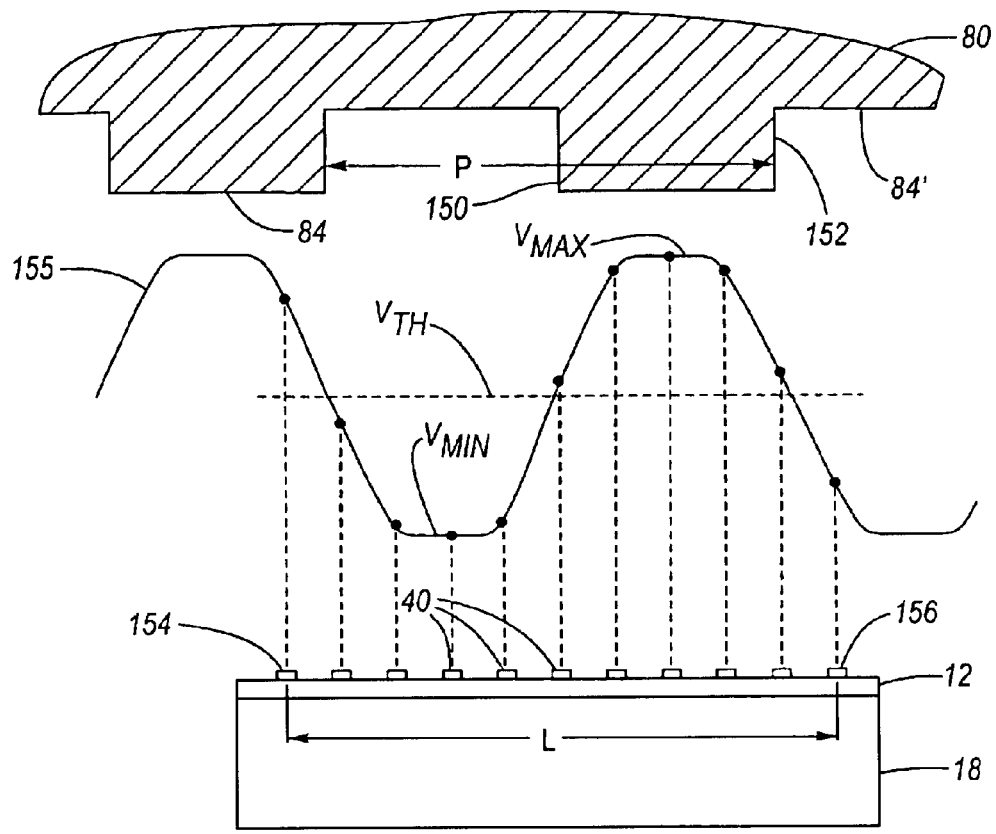
FIG. 6 is a schematic view showing the magnetic flux density between an array and a target wheel.

FIG. 6 depicts a plot 155 of the magnetic flux density B between an array 14, for example, and its target wheel 80, for example. Since the output voltage of each element 40 of the array 14 is proportional to the magnetic flux density at each element, plot 155 also represents the output voltage V of the array elements. The first element of the array 14 is designated 154 whereas the last element is designated 156. The threshold voltage $V_{TH}$ is the average value of the maximum voltage $V_{MAX}$ and the minimum voltage $V_{MIN}$. L is, preferably, sufficiently larger than the tooth pitch P, for example L=1.25P, so that at least two tooth edges 150, 152, for example, of target wheel 80 are spanned by L. The angular width θ (see FIG. 4A) of tooth pitch P is equal to or, preferably, larger than the maximum total range of the twist angle of the torsion bar 90. Tooth edge 150 is, arbitrarily, designated to be a rising edge and tooth edge 152 is then designated to be a falling edge with respect to the array elements 40 proceeding from the first array element 154 to the last array element 156 regardless of the direction of rotation of the target wheel 80. The preceding relationships are, analogously, the same for each array and its respective target wheel and torsion bar.

Figure 7:
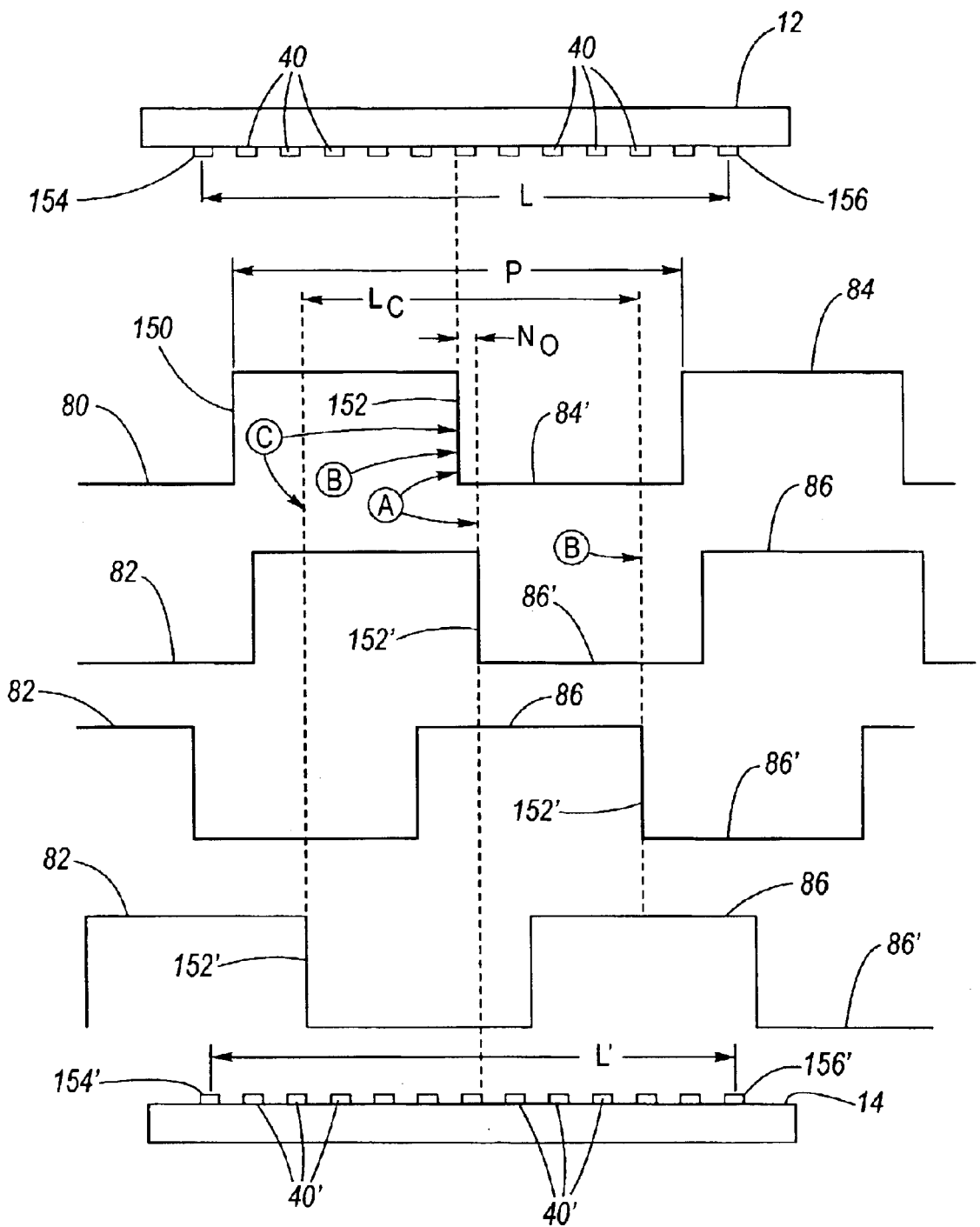
FIG. 7 is a schematic view illustrating the relationship between array lengths, target wheel tooth pitch, and compliance range of a torsion bar.

FIG. 7 is an example illustrating the relationship between the array lengths, for example L, L', target wheel tooth pitch, for example P, and compliance range $L_C$, for example of torsion bar 90, according to the present invention. The array 14 is located at the bottom of FIG. 7 for clarity and illustration purposes. The compliance range $L_C$ is the product of the diameter of the target wheel, for example the target wheel 80, and the maximum twist angle in radians in either a clockwise or counterclockwise direction about the axis of the calibrated torsion bar, for example the torsion bar 90, wherein the maximum twist angle in a clockwise direction is the sane as the maximum twist angle in the counterclockwise direction and $L_C$ is less than P. The position of the tooth edges 152, 152' at A represents the alignment of the target wheel 80 with respect to the target wheel 82 with no torque applied to the torsion bar 90, wherein $N_0$ is the net offset between the target wheels and is less than $L_C/2$. The position of the tooth edges 152, 152' at B represents the alignment of the target wheel 80 with respect to the target wheel 82 with maximum torque applied to the torsion bar 90 in, for example, a clockwise direction of rotation whereas the position of the tooth edges 152, 152' at C represents the alignment of the target wheel 80 with respect to the target wheel 82 with maximum torque applied to the torsion bar 90 in, for example, a counterclockwise direction. The compliance of a calibrated torsion bar, for example the torsion bar 90, is defined as the range of twist angle for maximum torque applied in a clockwise or counterclockwise direction, for example plus or minus 4°/Nm.

After manufacture and assembly, the individual elements, for example, elements 40 of the array 12 might not be sufficiently well matched. To achieve a final match of the elements, for example elements 40 of the array 12, the manufacturer, preferably, would perform a self-calibration routine on each array. An example of such a self-calibration routine for the elements 40 of the array 12 is as follows. The sensor 50 would be placed on a non-magnetic material resting upon a ferromagnetic plate. The thickness of the non-magnetic material would correspond to the intended operational air gap between the array 12 and the target wheel 80. The output voltage of each element 40 would be read and stored and the minimum voltage would be ascertained. The stored output voltage of each element 40 would then be divided by the minimum voltage and the results stored as scaling factors for each element of the array 12 in the digital signal processing electronics 16 or made available for entry thereto, thereby weighting each element by the scaling factors to produce a better match. Only the elements of the same array, for example 40 of array 12, are calibrated. There can be a mismatch between arrays, for example, the arrays 12, 14. The self-calibration of elements of other arrays would be performed in an analogous manner.

The present invention utilizes at least three algorithms to determine torque information, direction of rotation information, and speed information wherein the digital signal processing electronics 16, 56 are initialized with appropriate parameters to actualize algorithmic implementation, whereby algorithmic execution speed is negligible compared to movement of the target wheels 80, 82, 104, 106.

Figure 8:
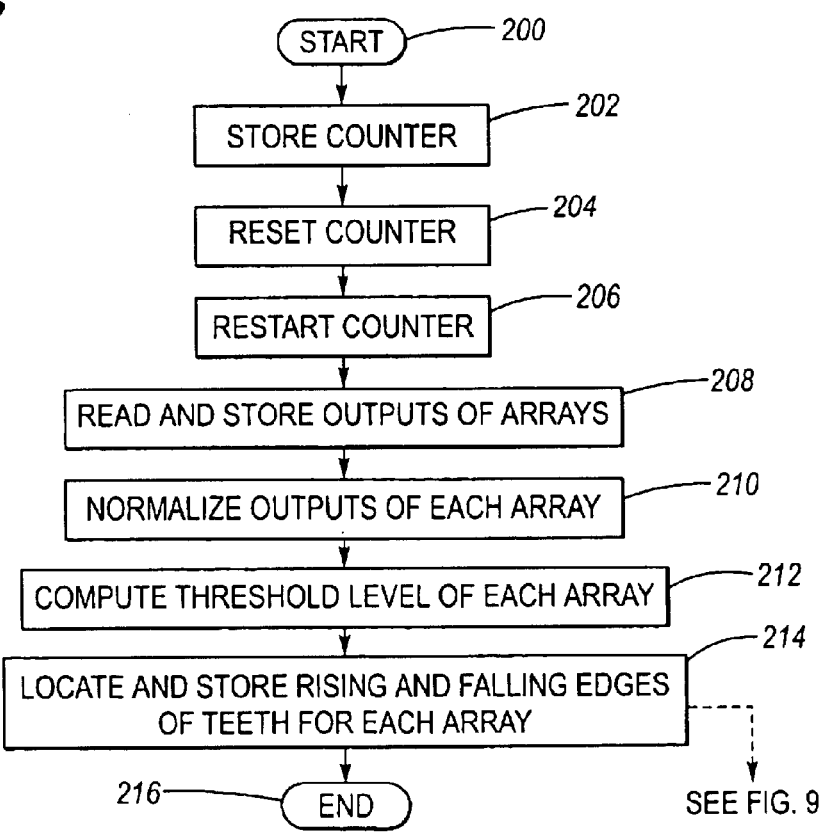
FIG. 8 is a tooth edge location flowchart.
Figure 9:
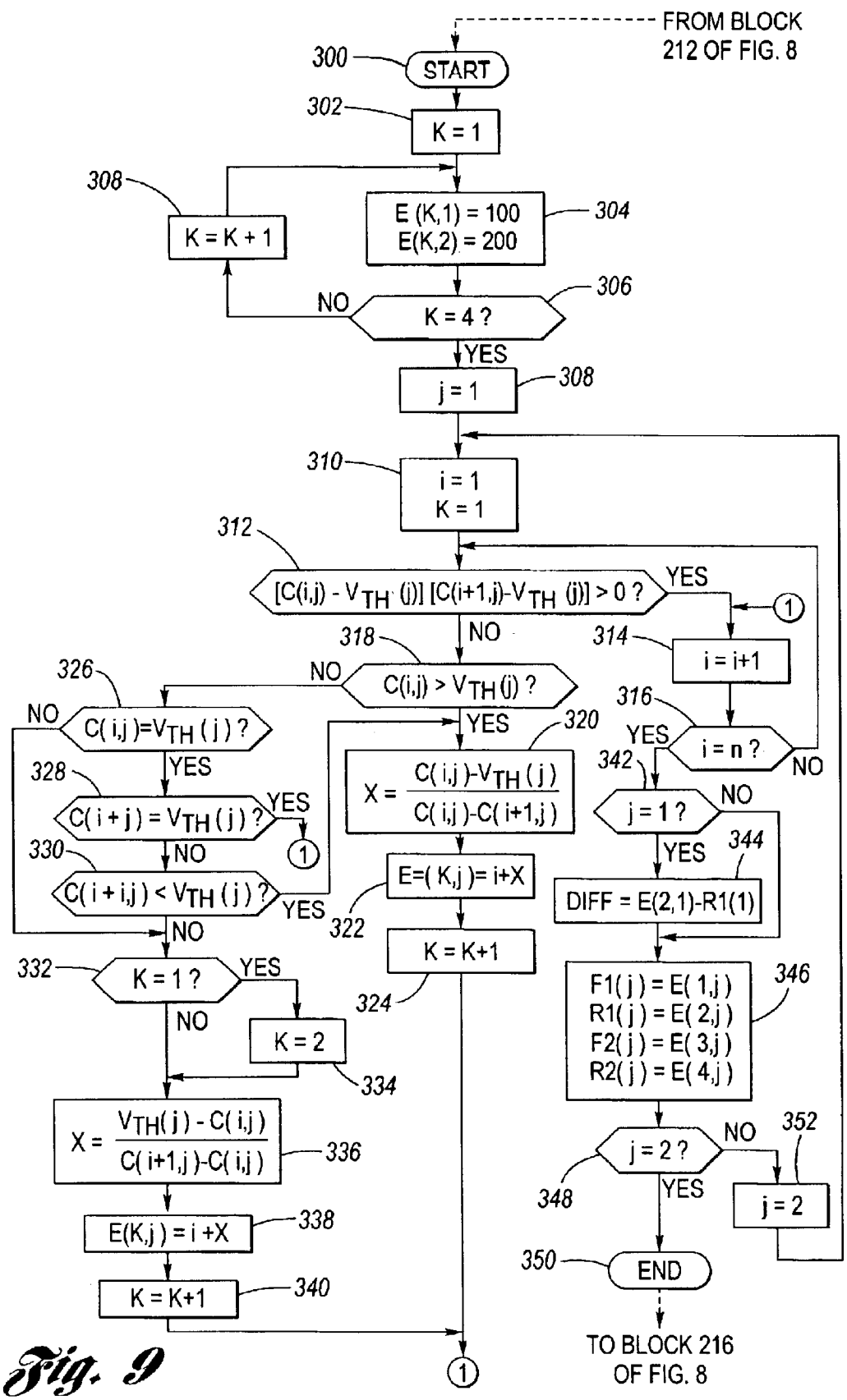
FIG. 9 is a detailed flow chart of Block 214 of the flowchart of FIG. 8.

A tooth edge location flowchart according to the present invention suitable for use with the examples of FIGS. 4 and 5 is depicted in FIGS. 8 and 9. For illustrative purposes, the flowchart of FIG. 8 will be described with the example of FIG. 4. The flowchart is initiated at Block 200. The counter (clock) count is stored, reset, and restarted at Blocks 202, 204, and 206, respectively, for subsequent use by a speed computation algorithm, to be described later. The outputs of array elements 40 of array 12 and array elements 40' of array 14 are read and stored by digital signal processing electronics 16 at Block 208, wherein the time required for reading and storing the outputs of the array elements by the digital signal processing electronics is such that the motions of the target wheels 80, 82 are negligible (that is, compared to the electronics computational speed, the target wheels appear stationary). Each element 40 of array 12 and each element 40' of array 14 is normalized by the respective scaling factors of each array, determined as previously described, at Block 210. At Block 212 the threshold levels (median values) of the elements 40 of array 12 and 40' of array 14 are computed by determining the midpoint of the maximum and minimum values of the elements of each array, respectively.

At Block 214 the location of rising and falling edges of teeth 84 of target wheel 80 within the view of array 12 and teeth 86 of target wheel 82 within the view of array 14 are determined and stored wherein the designation of rising and falling is with respect to the first elements 154 and 154', respectively, of each array as previously described. Block 216 signifies the end of the tooth edge location algorithm.

FIG. 9 presents a detailed flow chart of Block 214 of FIG. 8 starting at Block 300. Blocks 302, 304, 306, and 308 initialize a first memory array consisting of eight elements (4×2), designated E(k,1) and E(k,2) wherein k varies from 1 to 4, for the storage of the locations of rising and falling tooth edges of the arrays 12, 14, wherein the initialization values for the elements of the first memory array, for example 100 for array 12 and 200 for array 14, are, arbitrarily, assigned values much larger than the number of elements 40 of array 12 or elements 40' of array 14. The first memory array allows for the storage of the locations of two rising and two falling tooth edges per each of the arrays 12, 14. A first array is selected at Block 308, in this case array 12. Block 310 selects the first element of the selected array, in this case element 154 of array 12, and initializes parameter k.

Block 312 tests whether the normalized outputs of adjacent array elements are both above or both below the threshold value of the selected array wherein adjacent array elements are defined to be the selected array element and the next higher numbered array element of the selected array.

If Block 312 tests yes, control passes to Block 314 where the next element of the selected array is selected. If the last element of the selected array is selected at Block 314, Block 316 passes control to Block 342. Otherwise, control passes to Block 312.

If Block 312 tests no, control passes to Block 318. Block 318 tests whether the normalized output of the selected element of the selected array is above the threshold value of the selected array. If Block 318 tests yes, then there is a falling tooth edge between the adjacent array elements and control passes to Block 320.

Block 320 computes the location of the falling tooth edge as a fraction of the distance from the selected array element to its adjacent array element of the selected array. Block 322 stores the location of the falling tooth edge in a unique element of the first memory array and the parameter k is increased at Block 324 afterwhich control passes to Block 314.

If Block 318 tests no, Block 326 tests whether the normalized output of the selected array element is the same as the threshold value of the selected array. If Block 326 tests yes, Block 328 tests whether the normalized output of the adjacent array element is the same as the threshold value of the selected array. If Block 328 tests yes, control passes to Block 314.

If Block 328 tests no, Block 330 tests whether the normalized output of the adjacent array element of the selected array is below the threshold value of the selected array. If Block 330 tests yes, then there is a falling tooth edge between the adjacent array elements and control passes to Block 320.

If Block 326 or Block-330 tests no, then there is a rising tooth edge between the adjacent array elements of the selected array and control passes to Block 332. The value of parameter k is tested at Block 332. If k equals one, the value of k is increased to two at Block 334 and control passes to Block 336. If k is not equal to one, control passes to Block 336 bypassing Block 334.

Block 336 computes the location of the rising tooth edge as a fraction of the distance from the selected array element to its adjacent array element of the selected array. Block 338 stores the location of the falling tooth edge in a unique element of the first memory array and the parameter k is increased at Block 340, after which control passes to Block 314.

When the last element of the selected array is selected at Block 314, Block 316 passes control to Block 342. Block 342 tests whether the selected array is a first array, in this case array 12. If yes, then the change in position of the first rising tooth edge, viewed by a first array between the present execution of FIG. 8 and the previous execution of FIG. 8, is stored in the variable DIFF at Block 344 afterwhich control passes to Block 346. If no, control passes directly to Block 346 bypassing Block 344. A speed computation algorithm, to be described later, utilizes the variable DIFF.

At Block 346, the locations of the first and second rising and falling tooth edges of the selected array stored in the first memory array are, optionally, stored in unique elements of a second, third, fourth, and fifth memory array wherein each memory array consists of two elements, designated F1(j), R1(j), F2(j), and R2(j), respectively, wherein j varies from 1 to 2. Block 348 tests whether a second array has been selected, in this case array 14. If yes, control passes to Block 350 and continues to Block 216 of FIG. 8 whereby the tooth edge location algorithm is completed. If no, a second array is selected at Block 352, in this case array 14, and control passes to Block 310, whereat the above procedure is repeated.

At the completion of the tooth edge locating algorithm of FIGS. 8 and 9, the memory arrays mentioned previously have the following tooth edge locations:

$$E(1,1)=F1(1)=\text{First falling of first selected array (array 12)} \quad (1)$$

$$E(2,1)=R1(1)=\text{First rising of first selected array (array 12)} \quad (2)$$

$$E(3,1)=F2(1)=\text{Second falling of first selected array (array 12)} \quad (3)$$

$$E(4,1)=R2(1)=\text{Second rising of first selected array (array 12)} \quad (4)$$

$$E(1,2)=F1(2)=\text{First falling of second selected array (array 14)} \quad (5)$$

$$E(2,2)=R1(2)=\text{First rising of second selected array (array 14)} \quad (6)$$

$$E(3,2)=F2(2)=\text{Second falling of second selected array (array 14)}(7)$$

$$E(4,2)=R2(2)=\text{Second rising of second selected array (array 14)}.(8)$$

Tooth edge locations utilizing FIG. 5 would be performed in an analogous manner.

Figure 10:
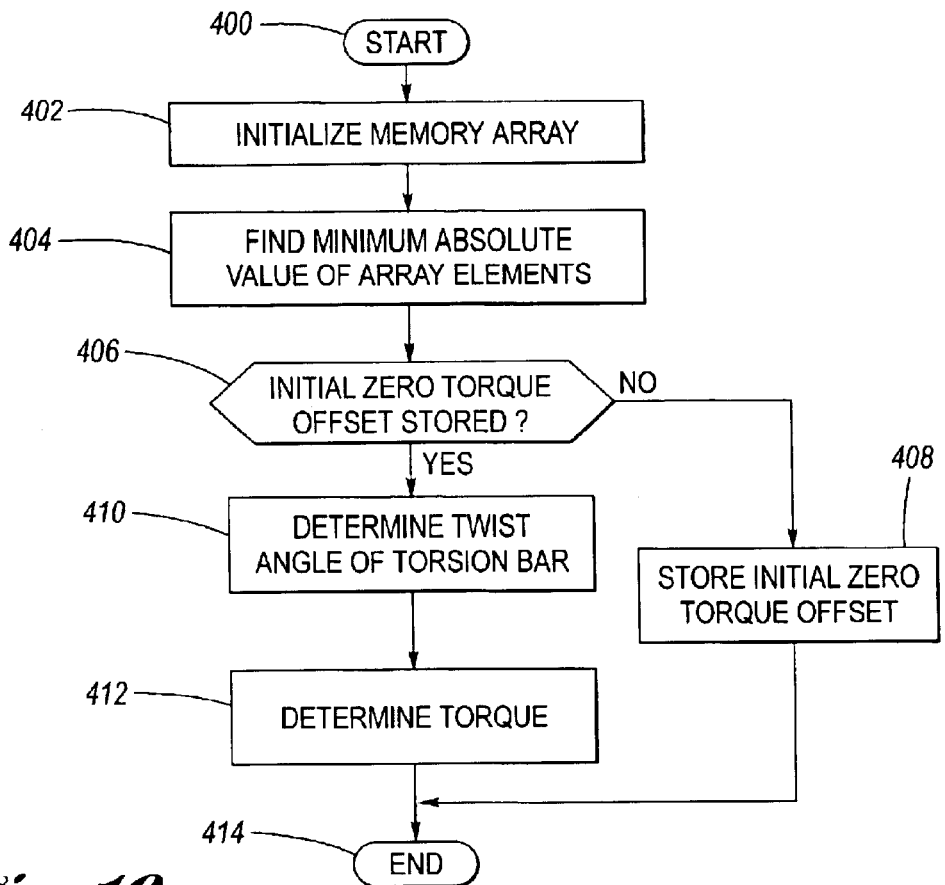
FIG. 10 depicts a torque computation algorithm.

FIG. 10 depicts a torque computation algorithm. The torque computation algorithm of FIG. 10 is capable of providing torque information whether a drive torque such as the steering wheel of a vehicle is rotating or is at standstill with respect to a load such as the steering mechanism of a vehicle. The algorithm starts at Block 400 and an eight-element memory array is initialized at Block 402. The values stored in the eight elements of the array, denoted for convenience as N(j) where the parameter j varies from 1 to 8, are differences of two falling tooth edge locations between the second and first selected arrays of FIGS. 8 and 9 or differences of two rising tooth edge locations between the second and first selected arrays of FIGS. 8 and 9, and are defined as follows:

$$N(1)=F1(2)-F1(1) \quad (9)$$

$$N(2)=F1(2)-F2(1) \quad (10)$$

$$N(3)=R1(2)-R1(1) \quad (11)$$

$$N(4)=R1(2)-R2(1) \quad (12)$$

$$N(5)=F2(2)-F1(1) \quad (13)$$

$$N(6)=F2(2)-F2(1) \quad (14)$$

$$N(7)=R2(2)-R1(1) \quad (15)$$

$$N(8)=R2(2)-R2(1) \quad (16)$$

where the arrays Fm(n) and Rm(n) for m and n varying from 1 to 2 are as defined previously.

The memory element of memory array N(j) containing the minimum of the absolute value of the eight elements of the memory array N(j) is determined at Block 404, and Block 406 tests whether an initial zero or no torque offset has been stored when the torque sensor is initially installed in the vehicle.

If Block 406 tests no under an initial zero or no torque condition, then the element of memory array N(j) determined at Block 404 contains the net offset $N_0$ (see FIG. 7), which is then stored at Block 408, afterwhich the procedure ends at Block 414. The magnitude of the net offset $N_0$ represents the minimum distance between like tooth edges, rising or falling, between the second and first selected array of FIGS. 8 and 9 under a zero or no torque condition. An initial zero or no torque condition occurs upon an initial installation of torque sensor 10 of FIG. 1 or torque sensor 50 of FIG. 2. When initially installed, torque sensor 10 of FIG. 1 or torque sensor 50 of FIG. 2 is first energized under a zero or no torque condition to determine, at Block 404, and store, at Block 408, the net offset $N_0$ which will be used in subsequent torque computations and dispenses with any alignments for the target wheels 80, 82 of FIG. 4 or the target wheels 104,106 of FIG. 5 or any alignments for the arrays 12, 14 of FIG. 4 or the arrays 52, 54 of FIG. 5. Subsequent zero or no torque conditions can be determined at Blocks 410 and 412, to be described.

If Block 406 tests yes, Block 410 determines the twist angle A of torsion bar 90 (FIG. 4) or torsion bar 102 (FIG. 5) where twist angle A is computed by:

$$A=(N-N_0)B \quad (17)$$

where $N_0$ is the net offset between the target wheels 80, 82, wherein target wheel 80 is identical to target wheel 82 or the net offset between the target wheels 104, 106, wherein target wheel 104 is identical to target wheel 106, N is the element of memory array N(j) determined at Block 404, and B is the angular separation, in degrees, between adjacent elements 40 of the array 12 or adjacent elements 40' of the array 14 (see FIG. 7), wherein the angular separation between adjacent elements 40 of the array 12 is the same as the angular separation between adjacent elements 40' of the array 14 or B is the angular separation, in degrees, between adjacent elements of array 52 or adjacent elements of array 54 (see FIG. 5) wherein the angular separation, in degrees, between adjacent elements of array 52 is the same as the angular separation, in degrees, between adjacent elements of array 54. B is defined as:

$$B=360 \, s/(\pi[D+2g]) \quad (18)$$

wherein s is the distance between adjacent elements 40 of array 12 or adjacent elements 40' of array 14, wherein array 12 is identical to array 14 or between adjacent elements of array 52 or adjacent elements of array 54, wherein array 52 is identical to array 54. D represents the diameter of target wheel 80 or target wheel 82, wherein target wheel 80 is identical to target wheel 82, or the diameter of target wheel 104 or target wheel 106, wherein target wheel 104 is identical to target 106. The parameter g represents either the air gap spacing between array 12 and target wheel 80 or between array 14 and target wheel 82, wherein the air gap spacing between array 12 and target wheel 80 is the same as the air gap spacing between array 14 and target wheel 82 or the air gap spacing between array 52 and target wheel 104 or array 54 and target wheel 106, wherein the air gap spacing between array 52 and target wheel 104 is preferably the same as the air gap spacing between array 54 and target wheel 106.

Figure 11:
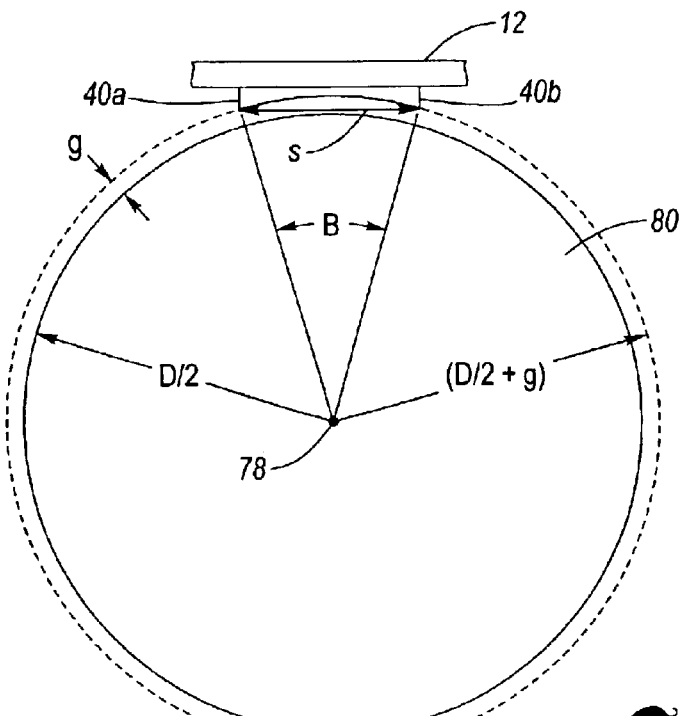
FIG. 11 is a schematic representation of an angular separation between adjacent array elements.

As an example, FIG. 11 depicts B utilizing array 12 and target wheel 80. Adjacent elements 40a and 40b of array 12 are separated by distance s and angle B measured from the center and axis 78 (see FIG. 4) of target wheel 80 which has a diameter D and an air gap separation g between each element and the target wheel. Equivalently, element 40a and 40b are separated by distance s on the circumference of a circle of radius (D/2+g) and are subtended by angle B. Mathematically, in units of radians:

$$B=s/(D/2+g)=2s/(D+2g) \quad (19)$$

Multiplying equation 19 by the conversion factor of 180 degrees/radian results in equation 18.

Torque is then determined at Block 412 and the procedure terminates at Block 414. Torque is computed by:

$$T=A/C \quad (20)$$

where C is the magnitude of the compliance, previously defined, of torsion bar 90 or torsion bar 102. If N equals $N_0$ in equation 18, then a zero or no torque condition exists. If N is greater than $N_0$ in equation 18, than the torque is positive denoting, for example, a clockwise torque whereas if N is less than $N_0$ in equation 18, than the torque is negative denoting, for example, a counterclockwise torque. Simulation has shown that the memory element of memory array N(j) determined at Block 404 is the correct value to determine the torque utilizing equations 17, 18, and 20.

Figure 12:
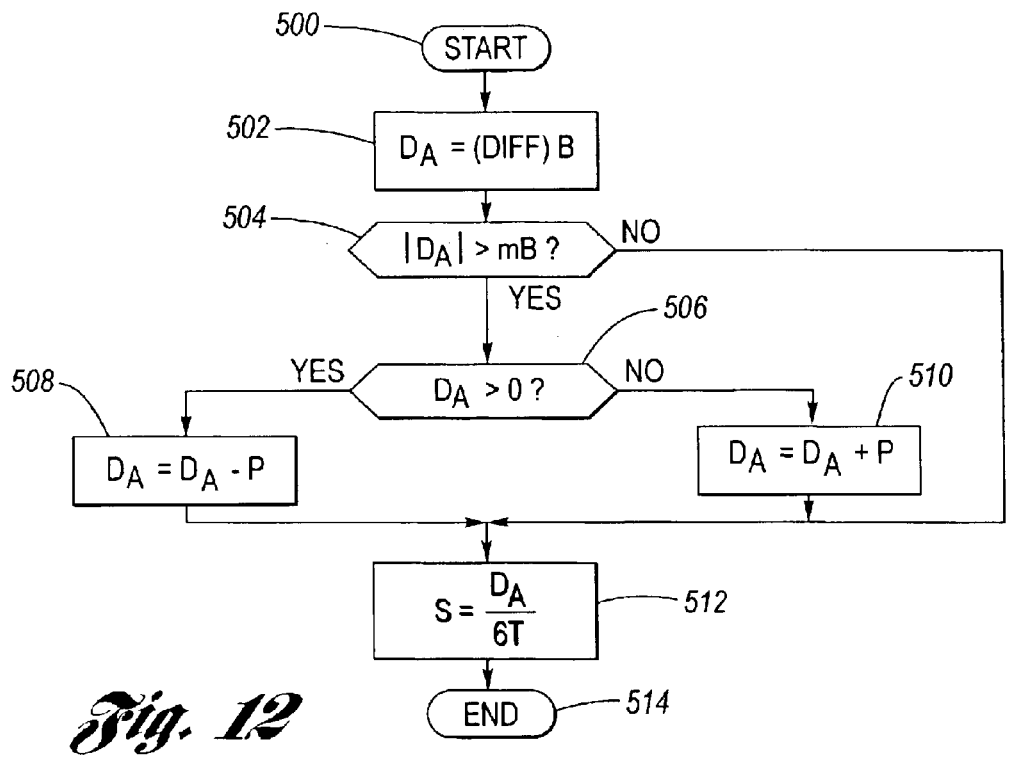
FIG. 12 is a speed and rotational direction computation algorithm.

FIG. 12 depicts a speed and rotational direction computation algorithm. The algorithm starts at Block 500 and the angular travel variable $D_A$, in degrees, is computed at Block 502 as:

$$D_A=(DIFF)B \quad (21).$$

The variable $D_A$ represents the angular travel of the target wheel, for example 80, associated with the first selected array of FIGS. 8 and 9, for example 12, during the time between successive iterations of the algorithms of FIGS. 8 and 9, whereat such time can be determined by the count stored at Block 202 of FIG. 8. The variable DIFF determined at Block 344 of FIG. 8 represents the difference in position between a present position of a first rising tooth edge of the first selected array of FIGS. 8 and 9, for example array 12, and a previous position of a first rising tooth edge of the first selected array of FIGS. 8 and 9, for example array 12, during the time between successive iterations of the algorithms of FIGS. 8 and 9 and is determined by:

$$DIFF=E(2,1)-R1(1) \quad (22)$$

wherein E(2,1) is defined by equation 2 and represents a present position of a first rising tooth edge of the first selected array of FIGS. 8 and 9, for example array 12, and R1(1) represents a previous position of a first rising tooth edge of the first selected array of FIGS. 8 and 9, for example array 12, during the time between successive iterations of the algorithms of FIGS. 8 and 9. The angular separation B is defined by equation 18.

An upper speed limit occurs when the time T, wherein T represents the time (in seconds), between successive iterations of the algorithms of FIGS. 8 and 9, whereat such time can be determined by the count stored at Block 202 of FIG. 8, corresponding to the target wheel, for example target 80, traveling a distance equal to the pitch P of the target wheel. In the case of an automotive steering system, T is on the order of 200 microseconds and the angular tooth pitch P of the target wheel, for example target wheel 80, is on the order of 18 degrees, resulting in a speed of about 15,000 RPM, which is much larger than actual speeds of the target wheel.

The position change, during the time T, of a first rising tooth edge of the first selected array of FIGS. 8 and 9, for example array 12, is taken to be no larger than a certain number m of adjacent element spacings s of the first selected array, such that the product ms is at least s less than the tooth pitch P of the associated target wheel, for example target wheel 80. In this regard, preferably a few s less than P would result in a calculated speed still much larger than the actual speed of the target wheel but would provide a simplification to the speed computation algorithm for the following two cases wherein the number m in Block 504 is selected such that the product ms, where s represents the distance between adjacent elements of a first selected array of FIGS. 8 and 9, for example array 12, is at least s less than the tooth pitch P of the target wheel associated with the first selected array of FIGS. 8 and 9, for example target wheel 80, and, preferably, a few s less than P.

A first case results when the target wheel, for example target wheel 80, is rotating in, for example, a clockwise direction and a previous position of a first rising tooth edge of the first selected array of FIGS. 8 and 9, for example array 12, stored in memory element R1(1) is at or near, for example, the first element of the first selected array, wherein the time T the target wheel rotates such that present first rising tooth edge of the first selected array stored in memory element E(2,1) is at or near the last element of the first selected array. In this first case, the value of the variable DIFF is larger than the correct value by the tooth pitch P of the associated target wheel, for example 80, of the first selected array of FIGS. 8 and 9, for example array 12, and also larger than the number m which is equivalent to $D_A$ having a value greater than the product mB. A second case results when the target wheel, for example 80, is rotating in, for example, a counterclockwise direction and a previous position of a first rising tooth edge of the first selected array of FIGS. 8 and 9, for example array 12, stored in memory element R1(1) is at or near, for example, the last element of the first selected array, wherein the time T the target wheel rotates such that present first rising tooth edge of the first selected array stored in memory element E(2,1) is at or near the first element of the first selected array. In this second case, the value of the variable DIFF is smaller than the correct value by the tooth pitch P of the associated target wheel, for example target wheel 80, of the first selected array of FIGS. 8 and 9, for example array 12, and also less than the number m which is equivalent to $D_A$ having a value less than the product mB or the absolute value of $D_A$ having a value greater than the product mB.

Block 504 tests whether the magnitude of $D_A$ is greater than the product mB. If no, speed S, in revolutions per minute (RPM), is computed at Block 512. The algorithm ends at Block 514.

If Block 504 tests yes, Block 506 tests whether the value of $D_A$ is greater than zero. If yes, then the value of $D_A$, corresponding to the first case previously described, is corrected at Block 508. Speed, S, in revolutions per minute (RPM), is computed at Block 512. The algorithm ends at Block 514.

If Block 506 tests no, then the value of $D_A$, corresponding to the second case previously described, is corrected at Block 510. Speed, S, in revolutions per minute (RPM), is computed at Block 512. The algorithm ends at Block 514.

To those skilled in the art to which this invention appertains, the above described preferred embodiment may be subject to change or modification. Such change or modification can be carried out without departing from the scope of the invention, which is intended to be limited only by the scope of the appended claims.

What is claimed is:

1. A torque sensor, comprising:
    a first target wheel having peripherally located first magnetic irregularities;
    a second target wheel having peripherally located second magnetic irregularities;
    a torsion bar fixedly connected to each of said first and second target wheels, wherein said first and second target wheels are mutually spaced a predetermined distance apart;
    a first magnetosensitive sensor located adjacent said first target wheel, wherein said first magnetosensitive sensor comprises a first array comprising a plurality of first magnetosensitive elements;
    a second magnetosensitive sensor located adjacent said second target wheel, wherein said second magnetosensitive sensor comprises a second array comprising a plurality of second magnetosensitive elements;
    a first source of magnetic field at said first magnetosensitive sensor and magnetically interacting with said first magnetic irregularities so that said first magnetosensitive elements sense relative position of said first magnetic irregularities;
    a second source of magnetic field at said second magnetosensitive sensor and magnetically interacting with said second magnetic irregularities segments so that said second magnetosensitive elements sense relative position of said second magnetic irregularities; and
    an electronic circuit connected to said first and second magnetosensitive sensors which provides at least one preselected signal output responsive to relative movement of the first and second target wheels with respect to said first and second arrays, respectively.

2. The torque sensor of claim 1, wherein said first magnetic irregularities are movable relative to said second magnetic irregularities over a range of differential displacement; wherein said first array further comprises said first magnetosensitive elements arranged in a regularly spaced pattern extending a first length; wherein said second array further comprises said second magnetosensitive elements arranged in a regularly spaced pattern extending a second length; and wherein said first and second lengths extend at least as long as said range of differential displacement.

3. The torque sensor of claim 2, wherein said first magnetic irregularities comprise a first tooth and a first slot adjoining said first tooth, said first tooth and first slot defining a first pitch, and wherein said second magnetic irregularities comprise a second tooth and a second slot adjoining said second tooth, said second tooth and said second slot defining a second pitch; wherein said first length is longer than said first pitch; wherein said second length is longer than said second pitch; and wherein said first and second pitches are longer than said range of differential displacement.

4. The torque sensor of claim 3, wherein said first target wheel is substantially identical to said second target wheel; and wherein said first array is substantially identical to said second array.

5. The torque sensor of claim 3, wherein said first array, said second array and said electronic circuit are formed on a single substrate die.

6. The torque sensor of claim 3, wherein each of said first and second magnetosensitive elements comprise a plurality of linearly arranged magnetosensitive segments.

7. The torque sensor of claim 6, wherein said first magnetosensitive elements are arranged substantially transverse with respect to movement of said first target wheel; and wherein said second magnetosensitive elements are arranged substantially transverse with respect to movement of said second target wheel.

8. The torque sensor of claim 7, wherein said magnetosensitive elements comprise magnetoresistors.

9. The torque sensor of claim 8, wherein said first target wheel is substantially identical to said second target wheel; and wherein said first array is substantially identical to said second array.

10. The torque sensor of claim 9, wherein said first array, said second array and said electronic circuit are formed on a single substrate die.

11. A method for sensing information regarding a first target wheel relative to a second target wheel, comprising the steps of:
    providing the first target wheel comprising a first tooth and a first slot adjoining the first tooth at a first tooth edge;
    providing the second target wheel comprising a second tooth and a second slot adjoining the second tooth at a second tooth edge;
    serially arranging a plurality of first magnetosensitive elements to provide a first array;
    serially arranging a plurality of second magnetosensitive elements to provide a second array;
    sensing a position of the first tooth edge magnetically relative to the first array; and
    sensing a position of the second tooth edge magnetically relative to the second array.

12. The method of claim 11, further comprising the steps of:
    torsionally engaging said first target wheel with respect to said second target wheel;
    determining a zero torque position of said first tooth edge with respect to said second tooth edge;
    sensing a zero torque position of the first tooth edge relative to the first array;
    sensing a zero torque position of the second tooth edge relative to the second array;
    sensing a second position of the first tooth edge relative to the first array;
    sensing a second position of the second tooth edge relative to the second array;
    determining a relative position of the first tooth edge with respect to the second tooth edge responsive to said steps of sensing; and
    determining torque between said first and second target wheels responsive to the relative position of the first tooth edge with respect to the second tooth edge and said torsional engagement.

13. The method of claim 11, further comprising the steps of:
    calibrating said plurality first magnetosenstive elements to provide matching of each of the first magnetosensitive elements to each other magnetosensitive element in response to respectively corresponding movement of the first tooth edge; and
    calibrating said plurality second magnetosenstive elements to provide matching of each of the second magnetosensitive elements to each other magnetosensitive element in response to respectively corresponding movement of the second tooth edge.

14. The method of claim 11, further comprising the step of:

determining a relative position of the first tooth edge with respect to the second tooth edge responsive to said steps of sensing.

15. The method of claim 14, further comprising the steps of:

calibrating said plurality first magnetosenstive elements to provide matching of each of the first magnetosensitive elements to each other magnetosensitive element in response to respectively corresponding movement of the first tooth edge; and calibrating said plurality second magnetosenstive elements to provide matching of each of the second magnetosensitive elements to each other magnetosensitive element in response to respectively corresponding movement of the second tooth edge.

16. The method of claim 14, further comprising the steps of:

waiting a predetermined period of time after said steps of sensing;

sensing a second position of the first tooth edge relative to the first array;

sensing a second position of the second tooth edge relative to the second array;

determining a second relative position of the first tooth edge with respect to the second tooth edge responsive to said second steps of sensing; and determining a relative speed of movement of said first target wheel relative to said second target wheel responsive to said first and second relative positions and said predetermined period of time.

17. The method of claim 16, further comprising the steps of:

calibrating said plurality first magnetosenstive elements to provide matching of each of the first magnetosensitive elements to each other magnetosensitive element in response to respectively corresponding movement of the first tooth edge; and calibrating said plurality second magnetosenstive elements to provide matching of each of the second magnetosensitive elements to each other magnetosensitive element in response to respectively corresponding movement of the second tooth edge.

18. The method of claim 14, further comprising the steps of:

waiting a predetermined period of time after said steps of sensing;

sensing a second position of the first tooth edge relative to the first array;

sensing a second position of the second tooth edge relative to the second array;

determining direction of movement of said first tooth edge relative to said first array responsive to the steps of sensing position of said first tooth edge; and determining direction of movement of said second tooth edge relative to said second array responsive to the steps of sensing position of said second tooth edge.

19. The method of claim 18, further comprising the steps of:

calibrating said plurality first magnetosenstive elements to provide matching of each of the first magnetosensitive elements to each other magnetosensitive element in response to respectively corresponding movement of the first tooth edge; and calibrating said plurality second magnetosenstive elements to provide matching of each of the second magnetosensitive elements to each other magnetosensitive element in response to respectively corresponding movement of the second tooth edge.

20. The method of claim 12, further comprising the steps of:

calibrating said plurality first magnetosenstive elements to provide matching of each of the first magnetosensitive elements to each other magnetosensitive element in response to respectively corresponding movement of the first tooth edge; and calibrating said plurality second magnetosenstive elements to provide matching of each of the second magnetosensitive elements to each other magnetosensitive element in response to respectively corresponding movement of the second tooth edge.

* * * * *